(12) United States Patent
Hirasawa et al.

(10) Patent No.: US 8,852,361 B2
(45) Date of Patent: Oct. 7, 2014

(54) STAINLESS STEEL SHEET WITH EXCELLENT HEAT AND CORROSION RESISTANCES FOR BRAKE DISK

(75) Inventors: Junichiro Hirasawa, Tokyo (JP); Takumi Ujiro, Tokyo (JP); Osamu Furukimi, Tokyo (JP)

(73) Assignee: JFE Steel Corporation (JP)

( * ) Notice: Subject to any disclaimer, the term of this patent is extended or adjusted under 35 U.S.C. 154(b) by 1107 days.

(21) Appl. No.: 11/794,966

(22) PCT Filed: Oct. 20, 2005

(86) PCT No.: PCT/JP2005/019735
§ 371 (c)(1),
(2), (4) Date: Jul. 10, 2007

(87) PCT Pub. No.: WO2006/098056
PCT Pub. Date: Sep. 21, 2006

(65) Prior Publication Data
US 2008/0000737 A1    Jan. 3, 2008

(30) Foreign Application Priority Data
Mar. 17, 2005 (JP) ................................. 2005-076453

(51) Int. Cl.
*C22C 38/00* (2006.01)
*F16D 65/12* (2006.01)

(52) U.S. Cl.
CPC ...... *F16D 65/125* (2013.01); *F16D 2200/0017* (2013.01); *F16D 2200/0221* (2013.01)
USPC .......... 148/325; 420/60; 420/64; 188/218 XL

(58) Field of Classification Search
USPC .......................... 148/325; 420/56, 58, 60, 64; 188/218 XL
IPC ................. F16D 2200/0017, 2200/0021, 65/125
See application file for complete search history.

(56) References Cited

U.S. PATENT DOCUMENTS

| | | | | |
|---|---|---|---|---|
| 2,905,577 A * | 9/1959 | Harris et al. | ................... | 148/325 |
| 3,389,991 A * | 6/1968 | Tanczyn | .......................... | 420/69 |
| 6,386,342 B1 * | 5/2002 | Tsuge et al. | ............ | 188/218 XL |
| 6,479,013 B1 * | 11/2002 | Sera et al. | ........................ | 420/69 |
| 2004/0096352 A1 | 5/2004 | Ozaki et al. | | |

FOREIGN PATENT DOCUMENTS

| | | | |
|---|---|---|---|
| EP | 1 199 374 A1 | | 4/2002 |
| JP | 57-198249 A | | 12/1982 |
| JP | 60-106951 A | | 6/1985 |
| JP | 2001-192779 A | | 7/2001 |
| JP | 2001-220654 A | | 8/2001 |
| JP | 2001220654 | * | 8/2001 |
| JP | 2002-121656 A | | 4/2002 |
| JP | 2002-146489 A | | 5/2002 |
| JP | 2002146489 | * | 5/2002 |
| JP | 2003-253340 A | | 9/2003 |
| JP | 2004-346425 A | | 12/2004 |
| JP | 2005-133204 A | | 5/2005 |

* cited by examiner

Primary Examiner — Sikyin Ip
(74) *Attorney, Agent, or Firm* — DLA Piper LLP (US)

(57) ABSTRACT

A stainless steel sheet with excellent heat and corrosion resistances for a brake disk is provided. Specifically, in mass %, C: less than 0.10%, Si: 1.0% or less, Mn: 1.0 to 2.5%, P: 0.04% or less, S: 0.01% or less, Cr: more than 11.5% but not more than 15.0%, Ni: 0.1 to 1.0%, Al: 0.10% or less, Nb: more than 0.08% but not more than 0.6%, V: 0.02 to 0.3%, and N: more than 0.03% but not more than 0.10% are contained so that $0.03 \leq \{C+N-(13/93)Nb\} \leq 0.10$, $(5Cr+10Si+15Mo+30Nb+50V-9Ni-5Mn-3Cu-225N-270C) \leq 45$, and $\{(14/50)V+(14/90)Nb\} < N$ (wherein Cr, Si, Mo, Nb, Ni, Mn, Cu, V, N, and C represent the contents (mass %) of the corresponding elements) are satisfied. With such a composition, the stainless steel sheet for a brake disk can be provided with both excellent heat resistance and excellent corrosion resistance after tempering.

7 Claims, No Drawings

STAINLESS STEEL SHEET WITH EXCELLENT HEAT AND CORROSION RESISTANCES FOR BRAKE DISK

RELATED APPLICATION

This is a §371 of International Application No. PCT/JP2005/019735, with an international filing date of Oct. 20, 2005 (WO 2006/098056 A1, published Sep. 21, 2006), which is based on Japanese Patent Application No. 2005-076453, filed Mar. 17, 2005.

TECHNICAL FIELD

This disclosure relates to stainless steel sheets suitable for disks (rotors) for disk brakes of motorcycles, automobiles, and bicycles. More specifically, the disclosure relates to stainless steel sheets with excellent heat and corrosion resistances for brake disks. The stainless steel sheets can obtain an appropriate hardness after quenching and can retain the appropriate hardness only with a slight softening and have only a slight decrease in corrosion resistance after tempering at a high temperature due to friction heat by braking. The term steel sheet includes a steel strip.

BACKGROUND

A disk brake of motorcycles, automobiles, and bicycles inhibits rotation of a wheel by friction between a brake disk and a brake pad and thereby controls braking of a vehicle. Therefore, the brake disk is required to have an appropriate hardness. If the hardness is insufficient, the brake is less effective and the brake disk is rapidly worn by the friction with the brake pad. On the other hand, if the hardness is too high, there is a problem that brake squeal is apt to occur. The recommended appropriate hardness of a brake disk is in the range of about 32 to about 38 HRC. Here, the term HRC means Rockwell hardness (C-scale) determined in accordance with the specifications of JISZ2245.

Martensitic stainless steel sheets have been conventionally used as a brake disk material from the viewpoints of hardness and corrosion resistance. In the past, high-carbon martensitic stainless steel sheets, such as SUS420J2, were used after quenching and tempering. However, since the amount of work required for manufacturing was large, their use was temporary. Recently, low-carbon martensitic stainless steel sheets, which only require quenching as disclosed in Japanese Unexamined Patent Application Publication No. 57-198249 and Japanese Unexamined Patent Application Publication No. 60-106951, have been widely used as a brake disk material.

Recently, an improvement in the fuel efficiency of motorcycles and automobiles has been desired from the viewpoint of conservation of the global environment. Fuel efficiency can be effectively improved by reducing vehicle weight. Therefore, many studies are now aimed at vehicle weight reduction. Disk brakes, which are a braking device, are not an exception. Hence, the brake disk is miniaturized and the thickness is decreased (thin wall) in order to further reduce vehicle weight. However, the miniaturization and thin-walling of brake disks induce a decrease in heat capacity and, thereby, the degree of increase in brake disk temperature due to friction heat by braking is increased. Consequently, the brake disk temperature during braking has increased to about 600° C. with such miniaturizing and thin-walling. Therefore, it is a concern that brake disks formed of conventional materials are softened by tempering and that the durability and corrosion resistance thereof are decreased. Hence, materials with excellent heat and corrosion resistances for brake disks are desired.

To satisfy such a desire, for example, Japanese Unexamined Patent Application Publication No. 2002-146489 discloses a low-carbon martensitic stainless steel sheet containing at least one of Ti, Nb, V, and Zr in an appropriate amount. The softening due to an increase in temperature during use of a disk brake is effectively suppressed and, thereby, a decrease in hardness can be suppressed. In addition, Japanese Patent No. 3315974 discloses a stainless steel containing Nb or further containing a combination of Ti, V, and B in an appropriate amount in addition to Nb, which can effectively suppress temper-softening and is used for a brake disk.

Furthermore, Japanese Unexamined Patent Application Publication No. 2002-121656 discloses an inexpensive steel which is used for a rotor of a disk brake. The deterioration in material quality due to an increase in temperature during use of the disk brake can be substantially prevented by adjusting a GP value to about 50% or more and adjusting the amounts of Nb and V to appropriate values. The GP value is a relational expression of C, N, Ni, Cu, Mn, Cr, Si, Mo, V, Ti, and Al contents in the steel. In Japanese Unexamined Patent Application Publication No. 2001-192779, a martensitic stainless steel with high resistance against softening due to heat by braking is disclosed for use in brake disks. The steel can retain a desired hardness and have high resistance against temper-softening after conducting only quenching by controlling the total amount of C and N within a specific range and containing Mn, Ni, and Cu in appropriate amounts. Mn, Ni, and Cu are austenite-forming elements. The steel further contains Nb in an appropriate amount and at least one of Zr, Ti, and Ta.

However, in the technologies disclosed in Japanese Unexamined Patent Application Publication No. 2002-146489, Japanese Patent No. 3315974, Japanese Unexamined Patent Application Publication No. 2002-121656 and Japanese Unexamined Patent Application Publication No. 2001-192779, a relatively large amount of expensive alloy elements are necessarily used. Therefore, the manufacturing costs of brake disks are excessively high. Furthermore, the hardness is rapidly decreased and, simultaneously, corrosion resistance is decreased when the brake disks are maintained at about 600° C. for a long time (about 2 hours). Thus, there are problems.

It could therefore be advantageous to provide a stainless steel sheet with excellent heat and corrosion resistances for a brake disk. The stainless steel sheet should retain an appropriate hardness after quenching and can maintain a hardness of about 32 HRC or more (Rockwell hardness C-scale) determined in accordance with the specifications of JISZ2245 and have only a slight decrease in corrosion resistance after holding at about 600° C. for about 2 hours.

SUMMARY

We conducted intensive investigations into effects of alloy elements on resistance against temper-softening and corrosion, which can be indicators of heat resistance of martensitic stainless steel sheets. As a result, we found that a stainless steel sheet can retain a high hardness of about 32 HRC or more and have only a slight decrease in corrosion resistance, even if the steel sheet is tempered at about 600° C. for about 2 hours, by containing Nb, Ni and V in appropriate amounts and decreasing the relative content of C by increasing the content of N.

We conducted further investigations on the basis of the above-mentioned findings. We therefore provide:

(1) A stainless steel sheet with excellent heat and corrosion resistances for a brake disk containing, in mass %, C: not less than about 0.02% but less than about 0.10%, Si: from about 0.05% to about 1.0%, Mn: from about 1.0% to about 2.5%, P: about 0.04% or less, S: about 0.01% or less, Cr: more than about 11.5% but not more than about 15.0%, Ni: from about 0.1% to about 1.0%, Al: about 0.10% or less, Nb: more than about 0.08% but not more than about 0.6%, V: from about 0.02% to about 0.3%, and N: more than about 0.03% but not more than about 0.10% so that the following expressions (1) to (3) are satisfied:

$$0.03 \leq \{C+N-(13/93)Nb\} \leq 0.10 \quad (1)$$

$$(5Cr+10Si+15Mo+30Nb+50V-9Ni-5Mn-3Cu-225N-270C) \leq 45 \quad (2)$$

$$\{(14/50)V+(14/90)Nb\} < N \quad (3)$$

(wherein Cr, Si, Mo, Nb, Ni, Mn, Cu, V, N, and C represent the contents (mass %) of the corresponding elements), and the balance Fe and inevitable impurities.

(2) The stainless steel sheet according to the above (1), further containing, in mass %, at least one of Cu: from about 0.05% to about 0.5%, Mo: from about 0.01% to about 2.0%, and Co: from about 0.01% to about 2.0%, in addition to the above composition.

(3) In a disk for a disk brake, the disk is produced by heating the stainless steel sheet for a brake disk according to the above (1) or (2) as a raw material at about 1000° C. or less for quenching.

A stainless steel sheet with excellent heat and corrosion resistances for a brake disk can be readily and inexpensively manufactured. The stainless steel sheet has excellent corrosion resistance and can achieve an appropriate hardness of about 32 to about 38 HRC after quenching. Furthermore, the stainless steel sheet can retain a high hardness of about 32 HRC or more and only has a slight decrease in corrosion resistance after tempering by holding at about 600° C. for about 2 hours. Thus, industrially, significant effects can be achieved. In addition, we achieve the effect that a disk (rotor) with excellent durability for a disk brake of motorcycles, automobiles, bicycles, and snowmobiles can be inexpensively manufactured.

DETAILED DESCRIPTION

First, reasons for limiting the composition of a stainless steel sheet for a brake disk will be described. Hereinafter, mass % as a measure of content is simply referred to as C: not less than about 0.02% but less than about 0.10%

C is an element that determines hardness after quenching, and the C content is preferably about 0.02% or more to obtain an appropriate hardness in the range of about 32 to about 38 HRC after quenching. If the C content is about 0.10% or more, coarse Cr carbide is formed during tempering at a high temperature and rusting starts therefrom. Therefore, corrosion resistance and toughness are decreased. Consequently, the C content is limited to less than about 0.10%. From the viewpoint of corrosion resistance, the C content is preferably less than about 0.05%.

Si: from about 0.05% to about 1.0%

Si is an element that serves as a deoxidizer. The Si content is preferably about 0.05% or more. Since Si is an element that stabilizes a ferrite phase, an excessive Si content, such as higher than about 1.0%, decreases hardness after quenching and, furthermore, decreases toughness. Consequently, the Si content is limited to about 1.0% or less. From the viewpoint of toughness, the Si content is preferably about 0.3% or less.

Mn: from about 1.0% to about 2.5%

Mn is an element that inhibits generation of a ferrite phase at a high temperature. Mn improves a quenching property and is useful for obtaining stable hardness after quenching. The Mn content is about 1.0% or more. An excessive Mn content, such as higher than about 2.5%, decreases corrosion resistance. Consequently, the Mn content is limited to the range of about 1.0 to about 2.5%. From the viewpoint of quenching property, the Mn content is preferably about 1.5% or more.

P: about 0.04% or less

P is an element that decreases hot processability. Therefore, a lower P content is preferable. However, since the manufacturing cost is significantly increased for decreasing the P content to an extremely low level, the upper limit is determined to be about 0.04%. From the viewpoint of manufacturing ability, the P content is preferably about 0.02% or less.

S: about 0.01% or less

S is an element that decreases hot processability, like P. Therefore, a lower S content is preferable. However, since the manufacturing cost is significantly increased for decreasing the S content to an extremely low level, the upper limit is determined to be about 0.01%. From the viewpoint of manufacturing ability, the S content is preferably about 0.005% or less.

Cr: more than about 11.5% but not more than about 15.0%

Cr is an element useful for improving corrosion resistance, which is a characteristic of stainless steel. In order to achieve sufficient resistance against corrosion, a Cr content exceeding about 11.5% is necessary. However, a Cr content exceeding about 15.0% decreases processability and toughness. Consequently, the Cr content is limited to more than about 11.5% but not more than about 15.0%. The Cr content is preferably about 12.0% or more from the viewpoint of corrosion resistance, and is preferably about 13.5% or less from the viewpoint of toughness.

Ni: from about 0.1% to about 1.0%

Ni is an element that improves corrosion resistance and is necessary to be contained at about 0.1% or more. If the Ni content is higher than about 1.0%, the diffusion rate of Cr is decreased and, thereby, the annealing of a hot-rolled steel sheet for softening takes a long time. Thus, the productivity is decreased. Consequently, the Ni content is limited to the range of about 0.1 to about 1.0%. Furthermore, the Ni content is preferably about 0.3% or more from the viewpoint of corrosion resistance, and is preferably about 0.8% or less from the viewpoint of productivity.

Al: about 0.10% or less

Al is an element that serves as a deoxidizer. Though Al is added as a deoxidizer in respect of steelmaking, an excessive residual Al decreases processability and toughness of the steel. Consequently, the Al content is limited to about 0.10% or less. The Al content is preferably less than about 0.01%.

Nb: more than about 0.08% but not more than about 0.6%

Nb has high bond strength to C and N to form Nb carbide and Nb nitride, and thereby the recovery of a steel from deformation when the steel after quenching is held at about 600° C. (the recovery from deformation which is generated during quenching) is suppressed. Thus, temper-softening resistance is increased and heat resistance is improved. In order to achieve such effects, the Nb content is necessarily higher than about 0.08%. However, when the Nb content is higher than about 0.6%, the toughness is decreased. Consequently, the Nb content is limited to the range of more than about 0.08% but not more than about 0.6%. The Nb content is preferably about 0.11% or more from the viewpoint of heat resistance, and is preferably less than about 0.3% from the viewpoint of toughness.

V: from about 0.02% to about 0.3%

V is an element that forms fine carbide (VC) and nitride (VN) at a temperature of about 600 to about 700° C. and increases temper-softening resistance by deposition hardening and, thereby, improves heat resistance. The V content is necessarily about 0.02% or more. In particular, the effect of VN on the improvement of heat resistance is significantly high, and V in combination with a large amount of N can realize a further higher effect. On the other hand, the V content higher than about 0.3% decreases toughness. Consequently, the V content is limited to the range of about 0.02 to about 0.3%. From the viewpoint of heat resistance, the V content is preferably about 0.05% or more, more preferably about 0.10% or more.

N: more than about 0.03% but not more than about 0.10%

N is an element that determines hardness after quenching, like C. In addition, solid-solution N has an effect on improving corrosion resistance. Furthermore, N forms fine Cr nitride in the temperature range of about 500 to about 700° C. and increases temper-softening resistance by deposition hardening and, thereby, improves heat resistance of a steel sheet (disk). Additionally, though Cr carbide deposited during tempering is coarse and rusting starts therefrom, Cr nitride is fine and rusting does not occur and, thereby, the degree of increase in corrosion resistance after tempering is small. Therefore, if the hardness after quenching is the same, heat resistance and corrosion resistance are more excellent when the relative content of C is decreased by increasing the N content. In order to obtain such effects, the N content is necessarily higher than about 0.03%. However, the N content higher than about 0.10% decreases toughness. Consequently, the N content is limited to more than about 0.03% but not more than about 0.10%. From the viewpoints of heat resistance and corrosion resistance, the N content is preferably about 0.040% or more.

The above-mentioned base components are contained in the above-described ranges so that the following expressions (1) to (3) are satisfied:

$$0.03 \leq \{C+N-(13/93)Nb\} \leq 0.10 \quad (1)$$

$$(5Cr+10Si+15Mo+30Nb+50V-9Ni-5Mn-3Cu-225N-270C) \leq 45 \quad (2)$$

$$\{(14/50)V+(14/90)Nb\} < N \quad (3)$$

(wherein Cr, Si, Mo, Nb, V, Ni, Mn, Cu, N, and C represent the contents (mass %) of the corresponding elements). Furthermore, the left side value of the expression (2) is calculated by supposing the amount of Mo is zero when the Mo content is less than about 0.01% and the amount of Cu is zero when the Cu amount is less than about 0.05%.

The expression (1) defines conditions for obtaining a hardness in a predetermined appropriate range after quenching. The hardness after quenching is highly correlative with the amounts of solid-solution C and N. When C and N are bonded with Nb to form Nb carbide and Nb nitride, C and N do not contribute to hardness. Therefore, the hardness after quenching should be calculated by using the amounts of C and N which are determined by subtracting the amounts of C and N consumed by deposition from the amounts of C and N in the steel. In addition, the Cr carbide/nitride and V carbide/nitride are decomposed during heating for quenching to solid solution. Therefore, Cr and V do not consume C and N that influence hardness after quenching. When the value of the middle term of the expression (1) is less than about 0.03, the hardness after quenching is less than the lower limit (about 32 HRC) of a predetermined appropriate range. On the other hand, when the value of the middle term is larger than about 0.10, the hardness after quenching becomes higher than the upper limit (about 38 HRC). Therefore, the value of the middle term of the expression (1) is limited to the range of about 0.03 to about 0.10.

The expression (2) defines conditions for achieving an excellent stability after quenching. Here, the term "excellent stability after quenching" means that an austenitic phase is generated during heating for quenching so as to be about 80 vol % or more and the phase is transformed to a martensitic phase during cooling for quenching by air-cooling or cooling at a rate faster than air-cooling and thereby a predetermined hardness can be stably achieved after quenching. When the value of the left side of the expression (2) is higher than about 45, the temperature range of heating for quenching in order to generate about 80 vol % or more of an austenitic phase becomes narrow, and thereby stable hardness after quenching cannot be achieved. Consequently, the value of the left side of the expression (2) is limited to about 45 or less.

The expression (3) defines conditions for stably achieving solid-solution N that improves hardness and corrosion resistance and for improving heat resistance by a nitride. When the N content does not satisfy the expression (3), the N content is insufficient for generating a nitride of Nb or V during tempering. Therefore, Nb nitride, V nitride, and Cr nitride are not sufficiently deposited and, thereby, heat resistance is decreased. Furthermore, since the amount of the residual solid-solution N, not formed into a deposit, is decreased, corrosion resistance is also decreased.

Furthermore, in addition to the above-mentioned base components in the above-described ranges, the steel sheet may further contain at least one of Cu: from about 0.05% to about 0.5%, Mo: from about 0.01% to about 2.0%, and Co: from about 0.01% to about 2.0% as optional components depending on requirement so that the above-mentioned expressions (1) to (3) are satisfied. Cu, Mo, and Co are elements that each improve corrosion resistance, and the steel sheet may contain one or more of Cu, Mo, and Co selectively depending on requirement.

Cu is an element that improves corrosion resistance. When Cu is contained, the Cu content is preferably about 0.05% or more. When the Cu content exceeds about 0.5%, the effect is saturated and thereby an effect corresponding to the content cannot be expected. This is economically disadvantageous. Therefore, the Cu content is preferably limited to the range of about 0.05 to about 0.5%.

Mo and Co are also elements that improve corrosion resistance. When Mo and Co are contained, the contents of Mo and Co are each preferably about 0.01% or more. On the other hand, when the Mo content exceeds about 2.0% or the Co content exceeds about 2.0%, the effect of improving corrosion resistance is saturated and thereby an effect corresponding to the content cannot be expected. This is economically disadvantageous. Therefore, the Mo content is preferably limited to the range of about 0.01 to about 2.0% and the Co content is preferably limited to the range of about 0.01 to about 2.0%. In addition, from the viewpoint of corrosion resistance, the Mo and Co contents are each more preferably about 0.5% or more and less than about 1.0%.

The balance other than the above components is Fe and inevitable impurities. As the inevitable impurities, alkaline metals such as Na, alkaline earth metals such as Mg and Ba, rare earth elements such as Y and La, and transition elements such as Hf at a content of about 0.05% or less do not inhibit the effect. The stainless steel sheet may be either a hot-rolled steel sheet or a cold-rolled steel sheet.

The method for manufacturing the stainless steel sheet is not specifically limited. Any methods generally employed for manufacturing stainless steel sheets can be applied. For example, a method described below is preferable.

A molten steel having the above-mentioned composition is melted in a converter or in an electric furnace and then is further subjected to a secondary refining process such as vacuum oxygen decarburization (VOD) or argon oxygen decarburization (AOD). Then, a steel raw material is produced by a known casting method. As the casting method, a continuous casting method is preferable from the viewpoints of productivity and quality.

Then, the steel raw material is heated to preferably about 1100 to about 1250° C. and is hot rolled to a hot-rolled steel sheet having a predetermined thickness. The steel sheet for a brake disk preferably has a thickness of about 3 to about 8 mm. Preferably, the hot-rolled steel sheet is further subjected to annealing and is further descaled by shot blasting and acid cleaning, if necessary, to obtain a raw material for a brake disk. By this annealing of the hot-rolled steel sheet, a hardness of about 75 to about 88 HRB (Rockwell hardness B-scale) determined in accordance with the specifications of JISZ2245 can be achieved. The hardness is suitable for a raw material for a brake disk, and the steel sheet with this hardness can be directly used as raw material for a brake disk. In addition, the hot-rolled steel sheet after annealing may be subjected to shape correction by using a leveler or skin pass. Furthermore, the annealing temperature of the hot-rolled steel sheet may be preferably higher than about 700° C. but not higher than about 900° C.

Since the annealing of a hot-rolled steel sheet requires maintaining an annealing temperature for several hours, a batch-type muffle furnace is preferably used. After the completion of the step of maintaining the hot-rolled steel sheet at an annealing temperature, the steel sheet is slowly cooled in the muffle furnace. From the viewpoint of productivity, the cooling rate from the annealing temperature to about 500° C. is preferably higher than about 20° C./h.

When the thickness of a brake disk is small (less than about 3 mm), the above-mentioned hot-rolled steel sheet is further cold-rolled. Depending on requirement, the steel sheet is annealed. Then, the steel sheet is further descaled by acid cleaning, if necessary, to obtain a raw material for a brake disk.

The brake disk is generally manufactured as follows: The above-mentioned stainless steel sheet is used as a raw material and is punched into circular blanks having a predetermined size for a brake disk material. Then, this brake disk material is processed, e.g., provided with holes for letting out friction heat due to braking, and is subjected to quenching. The quenching is conducted by heating the brake disk material so that a predetermined area, namely, a friction portion where it is brought into contact with a brake pad, is heated to a pre-determined quenching temperature by high-frequency induction heating, and then cooling the brake disk material. Thus, the predetermined area (friction portion) is adjusted to have a pre-determined hardness. Additionally, in the brake disk material, even if the quenching temperature is a usual quenching temperature in the range of about 900 to about 1000° C., a sufficiently appropriate hardness after quenching can be achieved and the brake disk material can be provided with both excellent heat and corrosion resistances.

Then, if necessary, oxide scales generated by the quenching may be removed by grinding. Furthermore, depending on requirement, the brake disk material may be provided with a coating at areas other than the friction portion and then the surface of the friction portion may be polished to form a product (brake disk). The stainless steel sheet will now be further described in detail with reference to the example.

Example

Molten steels having compositions shown in Tables 1-1 and 1-2 were each melted in a high-frequency furnace to obtain 100 kgf of a steel ingot (steel raw material). These steel raw materials were processed into hot-rolled steel sheets (sheet thickness: 5 mm) by a usual hot rolling process. Furthermore, these hot-rolled steel sheets were subjected to annealing at 800° C. for 8 hours (in a reducing-gas atmosphere, slow cooling after the heating). Then, these hot-rolled steel sheets were subjected to acid cleaning to remove scales on the surfaces. Thus, raw materials for a brake disk were produced.

Test material pieces (size: 5×30×30 mm) were prepared from each raw material, and were quenched by heating the test material pieces to quenching temperatures (and held for 10 minutes at the temperatures) shown in Tables 2-1 and 2-2 and then air-cooling the test material pieces. After the quenching, the test material pieces were subjected to a quenching stability test and a heat resistance test. The tests were carried out as follows:

(1) Quenching Stability Test

Test pieces (size: 5×30×30 mm) after the quenching were each ground to remove surface scales. Then, the surface hardness HRC of each test piece was measured using a Rockwell hardness tester in accordance with the specifications of JISZ2245. The hardness was measured at 5 points for each test piece and the mean value of the measurements was used as the hardness of the test piece after quenching. When the hardness after quenching was 32 to 38 HRC, the test piece was determined to be excellent which was indicated by 0. When the hardness after quenching was outside the range of 32 to 38 HRC, the test piece was determined to be poor which was indicated by X.

(2) Heat Resistance Test

Test pieces (size: 5×30×30 mm) after the quenching were further tempered at 600° C. for 2 hours (then, air-cooled). The test pieces after tempering were ground to remove surface scales. Then, the surface hardness HRC of each test piece was measured using a Rockwell hardness tester in accordance with the specifications of JISZ2245. The hardness was measured at 5 points for each test piece and the mean value of the measurements was used for evaluation of heat resistance.

In addition, two test material pieces were prepared from each raw material and quenched by heating the test material pieces to 1000° C. (and held for 10 minutes at the temperature) and then air-cooling the test material pieces. Then, one test material piece of the two was tempered at 600° C. for 2 hours (then, air-cooled). The test material pieces, one subjected to quenching only and the other one subjected to quenching and tempering, were subjected to a corrosion resistance test. The test was carried out as follows:

(3) Corrosion Resistance Test

The test material pieces were processed into test pieces (size: 5×70×150 mm). Each test piece was wet-polished with #320 emery paper and then subjected to a combined cyclic corrosion test (CCT). The CCT conditions were spraying (at a chamber temperature of 35° C.) of a 0.5 mass % NaCl aqueous solution for 2.5 hours, drying (at a chamber temperature of 60° C.) for 1.0 hour, and moistening (at a chamber temperature of 50° C. and a humidity of 95%) for 1.0 hour in this order as one cycle, and four cycles were repeated for the test. The surface of each test piece after the test was visually observed to count the number of rusting points. Test pieces without rusting points were indicated by ○, test pieces with 1 to 4 rusting points were indicated by Δ, and test pieces with more than 4 resting points were indicated by X. The test pieces indicated by ○ or Δ were determined to have excellent corrosion resistance. The results are shown in Tables 2-1 and 2-2.

TABLE 1-1

| Test Material No. | Steel No. | Chemical Component (mass %) | | | | | | | | | | | | | Middle Term Value of Expression (1) | Left Side Value of Expression (2) | Left Side Value of Expression (3) | Satisfaction of Expression (3) |
|---|---|---|---|---|---|---|---|---|---|---|---|---|---|---|---|---|---|---|
| | | C | Si | Mn | P | S | Al | Cr | Ni | Nb | N | V | Cu | Mo | Co | | | | |
| 1 | A | 0.040 | 0.21 | 1.51 | 0.02 | 0.004 | 0.004 | 12.23 | 0.05 | 0.10 | 0.035 | 0.02 | — | — | — | 0.061 | 40.6 | 0.021 | ○ |
| 2 | B | 0.043 | 0.22 | 1.68 | 0.02 | 0.002 | 0.003 | 12.23 | 0.18 | 0.12 | 0.046 | 0.05 | — | — | — | 0.072 | 37.5 | 0.033 | ○ |
| 3 | C | 0.035 | 0.32 | 1.85 | 0.02 | 0.002 | 0.003 | 13.19 | 0.51 | 0.13 | 0.063 | 0.02 | 0.01 | — | — | 0.080 | 36.6 | 0.026 | ○ |
| 4 | D | 0.046 | 0.30 | 1.83 | 0.02 | 0.003 | 0.004 | 13.06 | 0.51 | 0.27 | 0.061 | 0.05 | 0.04 | — | — | 0.069 | 39.0 | 0.056 | ○ |
| 5 | E | 0.044 | 0.23 | 1.82 | 0.02 | 0.003 | 0.003 | 12.52 | 0.20 | 0.12 | 0.052 | 0.08 | 0.53 | — | — | 0.079 | 36.4 | 0.041 | ○ |
| 6 | F | 0.022 | 0.30 | 1.58 | 0.02 | 0.003 | 0.003 | 12.68 | 0.58 | 0.18 | 0.083 | 0.08 | 0.44 | — | — | 0.080 | 36.7 | 0.050 | ○ |
| 7 | G | 0.042 | 0.24 | 1.55 | 0.02 | 0.003 | 0.002 | 12.65 | 0.17 | 0.09 | 0.058 | 0.15 | 0.02 | — | — | 0.087 | 42.2 | 0.056 | ○ |
| 8 | H | 0.044 | 0.18 | 1.54 | 0.02 | 0.002 | 0.002 | 12.54 | 0.62 | 0.12 | 0.062 | 0.10 | 0.01 | 0.50 | — | 0.089 | 41.5 | 0.047 | ○ |
| 9 | I | 0.044 | 0.65 | 2.45 | 0.04 | 0.008 | 0.050 | 12.66 | 0.28 | 0.12 | 0.048 | 0.10 | 0.03 | 0.05 | — | 0.075 | 41.6 | 0.047 | ○ |
| 10 | J | 0.042 | 0.21 | 1.01 | 0.02 | 0.003 | 0.003 | 11.62 | 0.33 | 0.11 | 0.053 | 0.10 | 0.02 | — | — | 0.080 | 37.2 | 0.045 | ○ |
| 11 | K | 0.040 | 0.45 | 2.15 | 0.04 | 0.007 | 0.055 | 12.55 | 0.05 | 0.12 | 0.055 | 0.10 | 0.40 | 0.23 | — | 0.078 | 43.7 | 0.047 | ○ |
| 12 | L | 0.020 | 0.13 | 1.82 | 0.02 | 0.002 | 0.002 | 12.61 | 0.23 | 0.09 | 0.095 | 0.28 | 0.33 | — | — | 0.102 | 42.1 | 0.092 | ○ |
| 13 | M | 0.044 | 0.29 | 1.61 | 0.02 | 0.004 | 0.003 | 12.66 | 0.17 | 0.35 | 0.085 | 0.10 | 0.02 | — | — | 0.080 | 41.1 | 0.082 | ○ |
| 14 | N | 0.043 | 0.08 | 1.75 | 0.02 | 0.002 | 0.001 | 12.55 | 0.95 | 0.12 | 0.050 | 0.10 | 0.02 | 0.85 | — | 0.078 | 44.7 | 0.047 | ○ |
| 15 | O | 0.070 | 0.21 | 1.65 | 0.01 | 0.003 | 0.003 | 13.33 | 0.10 | 0.12 | 0.049 | 0.10 | 0.04 | — | — | 0.102 | 38.3 | 0.047 | ○ |
| 16 | P | 0.042 | 0.22 | 1.65 | 0.02 | 0.002 | 0.003 | 12.50 | 0.54 | 0.11 | 0.049 | 0.10 | 0.02 | — | 0.53 | 0.076 | 37.5 | 0.045 | ○ |
| 17 | Q | 0.042 | 0.28 | 1.05 | 0.01 | 0.003 | 0.003 | 12.77 | 0.75 | 0.15 | 0.060 | 0.12 | 0.03 | 0.12 | 0.15 | 0.081 | 42.0 | 0.057 | ○ |
| 18 | R | 0.043 | 0.66 | 1.64 | 0.02 | 0.002 | 0.002 | 11.62 | 0.35 | 0.12 | 0.049 | 0.10 | 0.02 | — | — | 0.075 | 39.3 | 0.047 | ○ |

○: Satisfied,
X: not satisfied
*) The Middle term of expression (1) is (C + N − (13/93)Nb).
—: Not added
**) The left side of expression (2) is 5Cr + 10Si + 15Mo + 30Nb + 50V − 9Ni − 5Mn − 3Cu − 225N − 270C.
***) The left side of expression (3) is (14/50)V + (14/90)Nb.

TABLE 1-2

| Test Material No. | Steel No. | Chemical Component (mass %) | | | | | | | | | | | | | | Middle Term Value of Expression (1) | Left Side Value of Expression (2) | Left Side Value of Expression (3) | Satisfaction of Expression (3) |
|---|---|---|---|---|---|---|---|---|---|---|---|---|---|---|---|---|---|---|---|
| | | C | Si | Mn | P | S | Al | Cr | Ni | Nb | N | V | Cu | Mo | Co | | | | |
| 19 | S | 0.043 | 0.21 | 1.53 | 0.01 | 0.003 | 0.003 | 12.56 | 0.17 | 0.45 | 0.080 | 0.02 | 0.02 | — | — | 0.060 | 40.6 | 0.076 | ○ |
| 20 | T | 0.024 | 0.15 | 1.53 | 0.02 | 0.002 | 0.002 | 12.74 | 0.41 | 0.12 | 0.054 | 0.10 | 0.02 | — | — | 0.061 | 43.8 | 0.047 | ○ |
| 21 | U | 0.044 | 0.17 | 1.98 | 0.02 | 0.002 | 0.003 | 14.23 | 0.65 | 0.12 | 0.050 | 0.10 | 0.03 | — | — | 0.077 | 42.6 | 0.047 | ○ |
| 22 | V | 0.065 | 0.12 | 1.65 | 0.02 | 0.002 | 0.004 | 13.32 | 0.12 | 0.12 | 0.048 | 0.10 | 0.02 | — | — | 0.096 | 38.7 | 0.047 | ○ |
| 23 | W | 0.025 | 0.08 | 1.95 | 0.01 | 0.002 | 0.004 | 12.55 | 0.35 | 0.12 | 0.036 | 0.05 | 0.05 | 0.05 | 0.01 | 0.044 | 42.5 | 0.033 | ○ |
| 24 | X | 0.020 | 0.22 | 1.61 | 0.02 | 0.003 | 0.003 | 12.52 | 0.31 | 0.12 | 0.100 | 0.28 | 0.02 | — | — | 0.103 | 43.7 | 0.097 | ○ |
| 25 | Y | 0.044 | 0.30 | 1.85 | 0.02 | 0.005 | 0.002 | 14.87 | 0.85 | 0.12 | 0.055 | 0.10 | 0.44 | — | — | 0.082 | 43.5 | 0.047 | ○ |
| 26 | Z | 0.046 | 0.31 | 1.60 | 0.02 | 0.002 | 0.002 | 12.28 | 0.25 | 0.13 | 0.039 | 0.13 | — | — | — | 0.067 | 43.5 | 0.057 | X |
| 27 | AA | 0.048 | 0.14 | 1.88 | 0.02 | 0.003 | 0.002 | 12.11 | 0.31 | 0.31 | 0.016 | 0.05 | — | — | — | 0.021 | 45.0 | 0.062 | X |
| 28 | AB | 0.066 | 0.31 | 1.48 | 0.02 | 0.002 | 0.002 | 12.22 | 0.11 | 0.08 | 0.015 | 0.11 | 0.25 | — | — | 0.070 | 41.8 | 0.043 | X |
| 29 | AC | 0.043 | 0.31 | 1.60 | 0.02 | 0.002 | 0.003 | 11.33 | 0.22 | 0.12 | 0.051 | 0.10 | 0.03 | — | — | 0.077 | 35.3 | 0.047 | ○ |
| 30 | AD | 0.042 | 0.12 | 1.65 | 0.02 | 0.003 | 0.002 | 12.58 | 0.25 | 0.13 | 0.039 | 0.01 | — | — | — | 0.063 | 37.9 | 0.023 | ○ |
| 31 | AE | 0.041 | 0.22 | 1.62 | 0.01 | 0.002 | 0.002 | 12.59 | 0.22 | 0.10 | 0.028 | 0.05 | — | — | — | 0.059 | 42.3 | 0.030 | X |
| 32 | AF | 0.041 | 0.12 | 1.64 | 0.01 | 0.003 | 0.002 | 12.62 | 0.18 | 0.08 | 0.045 | 0.10 | — | — | — | 0.075 | 40.7 | 0.040 | ○ |
| 33 | AG | 0.013 | 0.16 | 1.84 | 0.01 | 0.002 | 0.004 | 12.13 | 0.56 | 0.18 | 0.036 | 0.02 | — | — | — | 0.024 | 42.8 | 0.034 | ○ |
| 34 | AH | 0.044 | 0.23 | 1.58 | 0.02 | 0.002 | 0.003 | 13.45 | 0.18 | 0.13 | 0.085 | 0.10 | — | 0.12 | — | 0.111 | 39.7 | 0.048 | ○ |
| 35 | AI | 0.039 | 0.31 | 1.52 | 0.02 | 0.002 | 0.003 | 13.33 | 0.12 | 0.15 | 0.067 | 0.15 | — | — | — | 0.085 | 47.5 | 0.065 | ○ |
| 36 | AJ | 0.042 | 0.22 | 1.62 | 0.02 | 0.004 | 0.004 | 13.20 | 0.13 | 0.24 | 0.067 | 0.10 | 0.02 | 1.15 | — | 0.075 | 46.9 | 0.065 | ○ |

○: Satisfied,
X: not satisfied
*) The Middle term of expression (1) is (C + N − (13/93)Nb).
—: Not added
**) The left side of expression (2) is 5Cr + 10Si + 15Mo + 30Nb + 50V − 9Ni − 5Mn − 3Cu − 225N − 270C.
***) The left side of expression (3) is (14/50)V + (14/90)Nb.

TABLE 2-1

| Test Material No. | Steel No. | Quenching Quenching Temperature (° C.) | Quenching Stability Hardness after Quenching HRC | Evaluation* | Heat Resistance Hardness after Tempering HRC | Corrosion Resistance Evaluation** CCT after Quenching only | CCT after Tempering Tempering Conditions at 600° C. for 2 hours | Remarks |
|---|---|---|---|---|---|---|---|---|
| 1 | A | 900 | 34 | ○ | 32 | Δ | Δ | Example of the |
| 2 |  | 1000 | 34 | ○ | 32 |  |  | Present Invention |
| 3 | B | 900 | 35 | ○ | 32 | Δ | Δ | Example of the |
| 4 |  | 1000 | 35 | ○ | 32 |  |  | Present Invention |
| 5 | C | 900 | 36 | ○ | 32 | ○ | ○ | Example of the |
| 6 |  | 1000 | 36 | ○ | 32 |  |  | Present Invention |
| 7 | D | 900 | 35 | ○ | 32 | ○ | Δ | Example of the |
| 8 |  | 1000 | 35 | ○ | 32 |  |  | Present Invention |
| 9 | E | 900 | 35 | ○ | 32 | ○ | ○ | Example of the |
| 10 |  | 1000 | 35 | ○ | 32 |  |  | Present Invention |
| 11 | F | 900 | 35 | ○ | 32 | ○ | ○ | Example of the |
| 12 |  | 1000 | 35 | ○ | 32 |  |  | Present Invention |
| 13 | G | 900 | 36 | ○ | 32 | ○ | ○ | Example of the |
| 14 |  | 1000 | 36 | ○ | 32 |  |  | Present Invention |
| 15 | H | 900 | 36 | ○ | 33 | ○ | ○ | Example of the |
| 16 |  | 1000 | 36 | ○ | 33 |  |  | Present Invention |
| 17 | I | 900 | 35 | ○ | 33 | ○ | ○ | Example of the |
| 18 |  | 1000 | 35 | ○ | 33 |  |  | Present Invention |
| 19 | J | 900 | 35 | ○ | 33 | Δ | Δ | Example of the |
| 20 |  | 1000 | 35 | ○ | 33 |  |  | Present Invention |
| 21 | K | 900 | 33 | ○ | 32 | ○ | ○ | Example of the |
| 22 |  | 1000 | 34 | ○ | 33 |  |  | Present Invention |
| 23 | L | 900 | 37 | ○ | 35 | ○ | ○ | Example of the |
| 24 |  | 1000 | 37 | ○ | 35 |  |  | Present Invention |
| 25 | M | 900 | 35 | ○ | 34 | ○ | ○ | Example of the |
| 26 |  | 1000 | 35 | ○ | 34 |  |  | Present Invention |
| 27 | N | 900 | 33 | ○ | 32 | ○ | ○ | Example of the |
| 28 |  | 1000 | 34 | ○ | 32 |  |  | Present Invention |
| 29 | O | 900 | 37 | ○ | 34 | ○ | Δ | Example of the |
| 30 |  | 1000 | 37 | ○ | 34 |  |  | Present Invention |
| 31 | P | 900 | 35 | ○ | 34 | ○ | ○ | Example of the |
| 32 |  | 1000 | 35 | ○ | 34 |  |  | Present Invention |
| 33 | Q | 900 | 35 | ○ | 33 | ○ | ○ | Example of the |
| 34 |  | 1000 | 35 | ○ | 33 |  |  | Present Invention |
| 35 | R | 900 | 35 | ○ | 33 | Δ | Δ | Example of the |
| 36 |  | 1000 | 35 | ○ | 33 |  |  | Present Invention |

*Hardness after quenching in the range of 32 to 38 HRC: ○, Hardness outside the range: X
**No rusting: ○, 1 to 4 rusting points: Δ, More than 4 rusting points: X

TABLE 2-2

| Test Material No. | Steel No. | Quenching Quenching Temperature (° C.) | Quenching Stability Hardness after Quenching HRC | Evaluation* | Heat Resistance Hardness after Tempering HRC | Corrosion Resistance Evaluation** CCT after Quenching only | CCT after Tempering Tempering Conditions at 600° C. for 2 hours | Remarks |
|---|---|---|---|---|---|---|---|---|
| 37 | S | 900 | 34 | ○ | 32 | ○ | ○ | Example of the |
| 38 |  | 1000 | 34 | ○ | 32 |  |  | Present Invention |
| 39 | T | 900 | 33 | ○ | 32 | ○ | ○ | Example of the |
| 40 |  | 1000 | 34 | ○ | 32 |  |  | Present Invention |
| 41 | U | 900 | 33 | ○ | 32 | ○ | ○ | Example of the |
| 42 |  | 1000 | 34 | ○ | 32 |  |  | Present Invention |
| 43 | V | 900 | 37 | ○ | 34 | ○ | Δ | Example of the |
| 44 |  | 1000 | 37 | ○ | 34 |  |  | Present Invention |
| 45 | W | 900 | 33 | ○ | 32 | ○ | ○ | Example of the |
| 46 |  | 1000 | 34 | ○ | 32 |  |  | Present Invention |
| 47 | X | 900 | 35 | ○ | 33 | ○ | ○ | Example of the |
| 48 |  | 1000 | 37 | ○ | 35 |  |  | Present Invention |
| 49 | Y | 900 | 33 | ○ | 32 | ○ | ○ | Example of the |
| 50 |  | 1000 | 34 | ○ | 33 |  |  | Present Invention |
| 51 | Z | 900 | 33 | ○ | 30 | Δ | X | Comparative |
| 52 |  | 1000 | 34 | ○ | 31 |  |  | Example |
| 53 | AA | 900 | 30 | X | 27 | Δ | X | Comparative |
| 54 |  | 1000 | 31 | X | 28 |  |  | Example |
| 55 | AB | 900 | 35 | ○ | 30 | Δ | X | Comparative |
| 56 |  | 1000 | 35 | ○ | 30 |  |  | Example |
| 57 | AC | 900 | 35 | ○ | 32 | X | X | Comparative |
| 58 |  | 1000 | 35 | ○ | 32 |  |  | Example |
| 59 | AD | 900 | 34 | ○ | 30 | ○ | Δ | Comparative |
| 60 |  | 1000 | 34 | ○ | 30 |  |  | Example |

TABLE 2-2-continued

| Test Material No. | Steel No. | Quenching Quenching Temperature (° C.) | Quenching Stability Hardness after Quenching HRC | Evaluation* | Heat Resistance Hardness after Tempering HRC | Corrosion Resistance Evaluation** CCT after Quenching only | CCT after Tempering Tempering Conditions at 600° C. for 2 hours | Remarks |
|---|---|---|---|---|---|---|---|---|
| 61 | AE | 900 | 34 | ○ | 30 | Δ | X | Comparative |
| 62 |    | 1000 | 34 | ○ | 30 |   |   | Example |
| 63 | AF | 900 | 35 | ○ | 30 | ○ | ○ | Comparative |
| 64 |    | 1000 | 35 | ○ | 30 |   |   | Example |
| 65 | AG | 900 | 31 | X | 27 | ○ | Δ | Comparative |
| 66 |    | 1000 | 31 | X | 27 |   |   | Example |
| 67 | AH | 900 | 40 | X | 35 | ○ | ○ | Comparative |
| 68 |    | 1000 | 40 | X | 35 |   |   | Example |
| 69 | AI | 900 | 31 | X | 28 | ○ | ○ | Comparative |
| 70 |    | 1000 | 33 | ○ | 30 |   |   | Example |
| 71 | AJ | 900 | 31 | X | 28 | ○ | ○ | Comparative |
| 72 |    | 1000 | 33 | ○ | 30 |   |   | Example |

*Hardness after quenching in the range of 32 to 38 HRC: ○, Hardness outside the range: X
**No rusting: ○, 1 to 4 rusting points: Δ, More than 4 rusting points: X Every example has a hardness in the range of 32 to 38 HRC after quenching and thus has excellent quenching stability. Furthermore, the examples each have a hardness of 32 or more HRC after tempering at 600° C. for 2 hours and thus have excellent heat resistance. In addition, the examples each have excellent corrosion resistance after quenching and also after tempering. On the other hand, the comparative examples having compositions being outside the range defined in the present invention exhibit a hardness of outside the range of 32 to 38 HRC after quenching, low heat resistance, or low corrosion resistance after quenching or tempering.

The invention claimed is:

1. A stainless steel sheet with excellent heat and corrosion resistances for a brake disk consisting of, in mass %:
   C: not less than about 0.02% but less than about 0.10%,
   Si: from about 0.05% to about 1.0%,
   Mn: from 1.00% to about 2.5%,
   P: about 0.04% or less,
   S: about 0.01% or less,
   Cr: more than about 11.5% but not more than about 15.0%,
   Ni: from about 0.1% to about 1.0%,
   Al: about 0.10% or less,
   Nb: more than 008% but not more than about 0.6%,
   Co: 0.01% to 0.53%,
   V: from about 0.02% to about 0.3%, and
   N: more than 0.03% but not more than about 0.10% so that the following expressions (1) to (3) are satisfied:

$$0.03 \leq \{C+N-(13/93)Nb\} \leq 0.10 \tag{1}$$

$$(5Cr+10Si+15Mo+30Nb+50V-9Ni-5Mn-3Cu-225N-270C) \leq 45 \tag{2}$$

$$\{(14/50)V+(14/90)Nb\} < N \tag{3}$$

(wherein Cr, Si, Mo, Nb, Ni, Mn, Cu, V, N, and C represent the contents (mass %) of the corresponding elements), and the balance Fe and inevitable impurities and has a hardness of 32 HRC or more after tempering at 600° C. for 2 hours.

2. The stainless steel sheet according to claim 1, wherein the hardness is 32 to 38 HRC.

3. A stainless steel sheet with excellent heat and corrosion resistances for a brake disk consisting of in mass %:
   C: not less than about 0.02% but less than about 0.10%,
   Si: from about 0.05% to about 1.0%,
   Mn: from 1.00% to about 2.5%,
   P about 0.04% or less,
   S: about 0.01% or less,
   Cr: more than about 11.5% but not more than about 15.0%,
   Ni: from about 0.1% to about 1.0%,
   Al: about 0.10% or less,
   Nb: more than 0.08% but not more than about 0.6%,
   Co: 0.01% to 0.53%,
   V: from about 0.02% to about 0.3%
   N: more than 0.03% but not more than about 0.10% at least one of Cu: from about 0.05% to about 0.5%, and Mo: from about 0.01% to about 2.0% so that the following expressions (1) to (3) are satisfied:

$$0.03 \leq \{C+N-(13/93)Nb\} \leq 0.10 \tag{1}$$

$$(5Cr+10Si+15Mo+30Nb+50V-9Ni-5Mn-3Cu-225N-270C) \leq 45 \tag{2}$$

$$\{(14/50)V+(14/90)Nb\} < N \tag{3}$$

(wherein Cr, Si, Mo, Nb, Ni Mn, Cu, V, N, and C represent the contents (mass %) of the corresponding elements), and the balance Fe and inevitable impurities and has a hardness of 32 HRC or more after tempering at 600° C. for 2 hours.

4. A stainless steel sheet with excellent heat and corrosion resistances for a brake disk comprising, in mass %:
   C: not less than about 0.02% but less than about 0.10%,
   Si: from about 0.05% to about 1.0%,
   Mn: from 1.00% to about 2.5%,
   P: about 0.04% or less,
   S: about 0.01% or less,
   Cr: more than about 11.5% but not more than about 15.0%,
   Ni: from about 0.1% to about 1.0%,
   Al: from 0.001% to about 0.10%,
   Nb: more than about 0.08% but not more than about 0.6%,
   Co: 0.01% to 0.53%,
   V: from about 0.02% to about 0.3%, and
   N: more than 0.03% but not more than about 0.10% so that the following expressions (1) to (3) are satisfied:

$$0.03 \leq \{C+N-(13/93)Nb\} \leq 0.10 \tag{1}$$

$$(5Cr+10Si+15Mo+30Nb+50V-9Ni-5Mn-3Cu-225N-270C) \leq 45 \tag{2}$$

$$\{(14/50)V+(14/90)Nb\} < N \tag{3}$$

(wherein Cr, Si, Mo, Nb, Ni, Mn, Cu, V, N, and C represent the contents (mass %) of the corresponding elements), and the balance Fe and inevitable impurities and has a hardness of 32 HRC or more after tempering at 600° C. for 2 hours.

5. The stainless steel sheet according to claim 4, wherein the hardness is 32 to 38 HRC.

6. A stainless steel sheet with excellent heat and corrosion resistances for a brake disk consisting of in mass %;
C: not less than about 0.02% but less than about 0.10%,
Si: from about 0.05% to about 1.0%,
Mn: from 1.00% to about 2.5%,
P: about 0.04% or less,
S: about 0.01% or less,
Cr: more than about 11.5% but not more than about 15.0%
Ni: from about 0.1% to about 1.0%,
Al: about 0.10% or less,
Nb: more than 0.08% but not more than about 04%,
Co: 0.01% to 0.53%,
V: from about 0.02% to about 0.3%,
at least one of Cu: from about 0.05% to about 0.5%, and
  Mo: from about 0.01% to about 2.0%, and
N: more than 0.03% but not more than about 0.10% so that the following expressions (1) to (3) are satisfied:

$$0.03 \leq \{C+N-(13/93)Nb\} \leq 0.10 \tag{1}$$

$$(5Cr+10Si+15Mo+30Nb+50V-9Ni-5Mn-3Cu-225N-270C) \leq 45 \tag{2}$$

$$\{(14/50)V+(14/90)Nb\} < N \tag{3}$$

(wherein Cr, Si, Mo, Nb, Ni, Mn, Cu, V, N, and C represent the contents (mass %) of the corresponding elements), and the balance be and inevitable impurities and has a hardness of 32 HRC or more after tempering at 600° C. for 2 hours.

7. A stainless steel sheet with excellent heat and corrosion resistances for a brake disk comprising, in mass %:
C: not less than about 0.02% but less than about 0.10%,
Si: from about 0.05% to about 1.0%,
Mn: from 1.00% to about 2.5%,
P: about 0.04% or less,
S: about 0.01% or less,
Cr: more than about 11.5% but not more than about 15.0%,
Ni: from about 0.1% to about 1.0%,
Al: from 0.001% to about 0.10%,
Nb: more than 0.08% but not more than about 0.6%,
Co: 0.01% to 0.53%,
V: front about 0.02% to about 0.3%,
at least one of Cu: front about 0.05% to about 0.5% and
  Mo: from about 0.01% to about 2.0%, and
N: more than 0.03% but not more than about 0.10% so that the following expressions (1) to (3) are satisfied:

$$0.03 \leq \{C+N-(13/93)Nb\} \leq 0.10 \tag{1}$$

$$(5Cr+10Si+15Mo+30Nb+50V-9Ni-5Mn-3Cu-225N-270C) \leq 45 \tag{2}$$

$$\{(14/50)V+(14/90)Nb\} < N \tag{3}$$

(wherein Cr, Si, Mo, Nb, Ni, Mn, Cu, V, N, and C represent the contents (mass %) of the corresponding elements), and the balance Fe and inevitable impurities and has as hardness of 32 HRC or more after tempering at 600° C. for 2 hours.

* * * * *